(12) United States Patent
Mrewed et al.

(10) Patent No.: US 12,533,999 B2
(45) Date of Patent: Jan. 27, 2026

(54) LINEAR DRIVE, LONGITUDINAL ADJUSTMENT UNIT OF A SEAT, AND MOTOR VEHICLE

(71) Applicant: IMS GEAR SE & CO. KGAA, Donaueschingen (DE)

(72) Inventors: Wassem Mrewed, Tuttlingen (DE); Marco Werschler, Radolfzell (DE); Kenny Nietzel, Villingen-Schwenningen (DE); Marcel Mittelbach, Schluchsee (DE)

(73) Assignee: IMS GEAR SE & CO. KGAA, Donaueschingen (DE)

( * ) Notice: Subject to any disclaimer, the term of this patent is extended or adjusted under 35 U.S.C. 154(b) by 0 days.

(21) Appl. No.: 18/640,488

(22) Filed: Apr. 19, 2024

(65) Prior Publication Data

US 2024/0351485 A1    Oct. 24, 2024

(30) Foreign Application Priority Data

Apr. 20, 2023   (EP) ..................................... 23169062

(51) Int. Cl.
*B60N 2/06* (2006.01)
*B60N 2/02* (2006.01)

(52) U.S. Cl.
CPC ......... *B60N 2/067* (2013.01); *B60N 2/02246* (2023.08)

(58) Field of Classification Search
CPC .............................. B60N 2/02246; B60N 2/067
See application file for complete search history.

(56) References Cited

FOREIGN PATENT DOCUMENTS

| EP | 3980668 A1 | 4/2022 | |
| JP | 2022143776 A | 10/2022 | |
| WO | 2020/245252 A1 | 12/2020 | |
| WO | WO-2020245255 A1 * | 12/2020 | ............. B60N 2/067 |

OTHER PUBLICATIONS

Machine translation of WO-2020245255-A1 (Year: 2020).*
Search report issued Oct. 2, 2023, for corresponding priority application No. EP 23 169062.9.

* cited by examiner

*Primary Examiner* — Randell J Krug
(74) *Attorney, Agent, or Firm* — Nath, Goldberg & Meyer; Jerald L. Meyer (57) ABSTRACT

A linear drive (1) has at least one rail (10) which is oriented along a longitudinal axis (L) and has at least one slotted link (20) which forms a tooth profile (21) and two profile surfaces (25, 26) facing one another. The drive has at least one slider (30) which is movable transversely to the longitudinal axis (L) and engages the slotted link (20), and a drive shaft (50). The slider (30) is coupled to the drive shaft (50) in such a way that the respective slider (30) performs at least one cyclical movement in the course of one revolution of the drive shaft (50) and can thereby alternately push itself off the profile surfaces (25, 26) facing one another in the slotted link (20) to generate propulsion in a direction of the longitudinal axis (L).

24 Claims, 10 Drawing Sheets

LINEAR DRIVE, LONGITUDINAL ADJUSTMENT UNIT OF A SEAT, AND MOTOR VEHICLE

CROSS-REFERENCE TO RELATED APPLICATIONS

Field

The present invention relates to a linear drive having at least one slider movable transversely to the longitudinal axis of a rail and engaging at least one slotted link, to a longitudinal adjustment unit for a seat having the linear drive, and to a motor vehicle having the seat with the longitudinal adjustment unit.

BACKGROUND

Linear drives are known from the prior art in various designs and are commonly used as longitudinal adjustment units for adjusting the position of a seat in motor vehicles. Longitudinal adjustment units typically interact with a lower rail fixed on a chassis and an upper rail arranged within said lower rail, it being possible to drive the upper rail by means of the longitudinal adjustment unit in a motorized manner and said rail being coupled to the seat. The adjustment of the upper rail by means of the longitudinal adjustment unit is typically carried out in the prior art by means of a spindle which is arranged within the upper rail and is supported at its respective first end and second end.

Longitudinal adjustment units of this type are known, for example, from DE 36 40 197 A1, DE 42 08 948 C2, DE 196 42 655 C2, DE 198 15 283 A1, DE 10 2004 013 009 A1, and DE 10 2006 052 936 A1.

Due to the demanding requirements placed on a linear drive which, in addition to the adjustment function as a longitudinal adjustment unit, must also ensure accident safety, such linear drives have different types of design requiring different production methods and processes. It has been shown that a play-free linear movement can be realized only with great effort and that breaking loads can be adapted only with great effort. Furthermore, known longitudinal adjustment units can only be used to a limited extent in the implementation of new seating concepts in vehicles.

SUMMARY

This is where the present invention comes in.

The object of the invention is to propose an improved linear drive which eliminates in an expedient manner the disadvantages known from the prior art. Furthermore, a linear drive with a particularly compact design is preferably to be specified, which in particular, allows for a virtually play-free linear movement with a simultaneous variable and adaptable breaking load. In addition, the proposed linear drive should be able to achieve a high adjustment speed.

The linear drive according to the invention having at least one rail which is oriented along a longitudinal axis and has at 5 least one slotted link forming a tooth profile. The at least one slotted link is preferably located in an associated rail plane and the slotted link comprises two profile surfaces facing one another. In addition, the linear drive has at least one slider and one drive shaft. The at least one slider can be moved transversely to the longitudinal axis and engages the at 10 least one slotted link, the at least one slider being coupled to the drive shaft in such a way that the at least one slider can perform at least one cyclical movement in the course of one rotation of the drive shaft and can thereby alternately push itself off the profile surfaces facing one another in the at least one slotted guide to generate propulsion in a direction of the longitudinal axis.

The present invention is based on the idea that the at least one slider engages the at least one tooth profile having a slotted link. The at least one slider preferably engages the slotted link in such a way that the slider is always secured in the slotted link in the longitudinal axis in a form-fitting manner and, when moving in a direction along the longitudinal axis, alternately pushes itself off and onto the profile surfaces of the tooth profiles facing one another. The slider can thus ensure a play-free linear movement in both directions oriented along the longitudinal axis.

Furthermore, the proposed linear drive can easily be extended in the longitudinal axis compared to the linear drives known from the prior art having a spindle, without changing the breaking behavior. For example, the rail can either be exchanged for a longer rail or a plurality of rails, even with different lengths, can be lined up along the longitudinal axis.

In a further development of the present invention, the linear drive has at least two sliders which engage the at least one slotted link and the engagement of the at least two sliders in the at least one slotted link takes place with a phase offset.

The phase offset between the at least two sliders can be achieved in different ways. For example, as will be described in more detail later, the at least two sliders can engage different slotted links, wherein the tooth profiles of the at least two slotted links are arranged so as to be offset in the longitudinal axis, or the at least two sliders being displaced at different angles of rotation transversely to the longitudinal axis by means of the drive shaft. By engaging at least two sliders in the phase, a particularly uniform movement along the longitudinal axis can be generated. At the same time, the breaking load of the linear drive can be easily dimensioned by using an appropriate number of sliders that engage the slotted link.

In addition, it has proven to be advantageous for the tooth profile of the slotted link to have a zigzag or wave-shaped contour. The two profile surfaces facing one another may have any number of teeth, each formed by a rising and falling tooth flank, the point or section between two adjacent tooth flanks being referred to herein as a transition. Preferably, the transitions between two profile surfaces facing one another of a slotted link are arranged approximately transversely to the longitudinal axis in a straight line.

According to a further development of the present invention, the spacing between the profile surfaces facing one another is constant or unchanging. The spacing between the profile surfaces facing one another is preferably measured transversely to the longitudinal axis.

According to a further development of the present invention, the at least one slotted link is designed as a groove or opening in the at least one rail. The groove or opening is preferably formed on a main surface, also referred to as a slotted link surface, of the rail and preferably has a constant groove depth.

Furthermore, it has proven to be advantageous for the respective slider to comprise at least one pin, preferably at least two pins, wherein the at least one pin engages the slotted link. The at least one pin protrudes from a base body of the slider and projects in an axis transversely to the longitudinal axis and transversely to the axis along which the at least one slider performs the cyclic and linear movement. If, according to a preferred embodiment, two or more pins are provided on the at least one slider, the spacing between the pins of the respective slider corresponds to the spacing between the adjacent teeth of the tooth profile.

Furthermore, it has proven to be advantageous for the at least one pin to have at least one friction surface which can come into operative contact with the profile surfaces facing one another in order to generate propulsion. The friction surface of the pin can come into surface contact or line contact with the respective profile surface.

It may also be advantageous for the at least one pin to have a casing which has improved frictional properties and allows for smooth rubbing on the profile surfaces facing one another.

According to a preferred development of the present invention, the at least one friction surface corresponds to the shape of a tooth base between two adjacent teeth, as a result of which the at least one friction surface of the at least one slider is in operative contact with two immediately adjacent tooth flanks of one of the profile surfaces facing one another.

In addition, it has proven to be advantageous for a spacing between the profile surfaces facing one another of the slotted link to correspond approximately with the spacing between two diametric sides of the at least one pin. In the event that two or more sliders are provided, it may be advantageous for the spacing between two diametric sides of the respective at least one pin to be slightly smaller than the spacing between the profile surfaces facing one another, as a result of which undesirable friction or jamming of the pin in the slotted link can be avoided.

Furthermore, in a further development of the present invention, the at least one pin is cuboid-, diamond-, or cylinder-shaped in cross section. In particular, it is preferable for the at least one pin to be cuboid- or diamond-shaped, as a result of which a planar operative contact can be achieved between the respective profile surface and the at least one pin.

Furthermore, according to a preferred development, it has proven to be advantageous for the respective slider and/or the slotted link to be symmetrical.

Furthermore, it has proven to be advantageous for the drive shaft to be arranged outside the slotted link. The slotted link is preferably located in the rail plane, the drive shaft being arranged either along or parallel to a normal vector of the rail plane or in a plane parallel and spaced apart from the rail plane along the longitudinal axis.

Furthermore, it has proven to be advantageous for at least two slotted links to be provided and for at least one slider to engage each of the at least two slotted links. The at least two slotted links may be on a single rail and extend there in parallel and spaced apart along the longitudinal axis or the at least two slotted links may be on two rails which are arranged in parallel with and spaced apart from one another along the longitudinal axis. The at least two slotted links are preferably arranged symmetrically to the drive shaft.

In a preferred development of the present invention, the at least two slotted links are arranged in a rail plane, in each case, wherein the at least two rail planes are arranged so as to be in parallel and spaced apart.

It has also proven to be advantageous for the respective rail to have a slotted link on two main surfaces facing one another or for at least two rails to be provided, and each of the at least two rails has at least one slotted link.

The at least one slotted link may be arranged on a side facing or facing away from an axis of rotation of the drive shaft, wherein combinations with at least two slotted links are entirely conceivable in which one of the slotted links is arranged on the side facing the drive shaft and the other slotted link is arranged on the side facing away from the drive shaft.

In a further development of the present invention, the drive shaft comprises at least one guide means which determines the cyclical movement of the at least two sliders during the rotation of the drive shaft. The guide means may be, for example, a crankshaft or camshaft and the respective slider may have contact surfaces that interact with the guide means. In the simplest case, the slider may have a recess or opening in which the at least one guide means of the drive shaft can come into operative contact with the contact surfaces of the slider.

In a further development of the present invention, the at least one guide means is designed such that the respective slider can perform an approximately linear movement between the turning points of the cyclical movement. A guide means of this kind can be formed, for example, from an approximately heart-shaped guide means, which is known, for example, from EP 3 980 668.

Furthermore, it has proven to be advantageous for a housing to be provided and for the drive shaft and the at least one slider to be movably mounted on the housing transversely to the longitudinal axis. The housing may, for example, be supported relative to the rail and may, for example, be coupled to the seat in a vehicle.

In a further advantageous embodiment of the present invention, a drive system is provided, wherein the drive system drives the at least one drive shaft. In particular, it is preferable for the drive system to be an electric drive system and for a gear, preferably a reduction gear, to be provided between the drive system and the drive shaft.

According to a preferred development of the present invention, the drive is arranged between at least two slides. For example, it is advantageous for the drive system to be arranged in the longitudinal axis between at least two sliders or for the drive to be arranged transversely to the longitudinal axis between at least two slides.

In addition, the present invention relates to a longitudinal adjustment unit having a linear drive according to the invention.

Another aspect of the present invention relates to a motor vehicle having at least one such linear drive according to the invention.

BRIEF DESCRIPTION OF THE DRAWINGS

An exemplary embodiment according to the invention as well as developments of the present invention are described in detail below with reference to the accompanying drawings. In the drawings.

DETAILED DESCRIPTION

Identical or functionally identical parts or features are identified with the same reference signs in the following detailed description of the figures. In addition, not all identical or functionally identical components are provided with a reference number in the figures.

Figure 1:
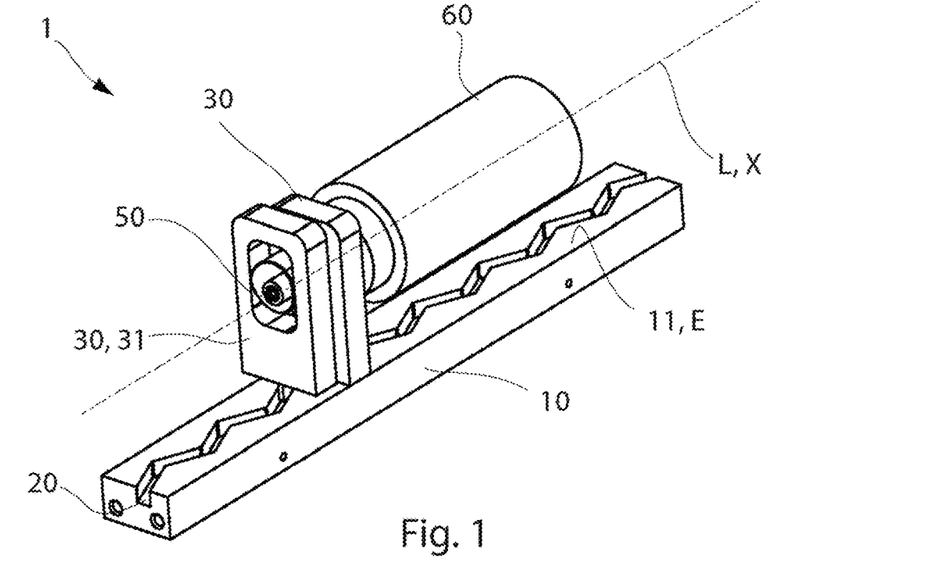
FIG. 1 is a perspective view of a first embodiment of a linear drive comprising a rail that is oriented along a longitudinal axis, a slider that engages the slotted link, and a drive shaft comprising a drive system by means of which the slider can be moved transversely to the longitudinal axis.

FIG. 1 shows an exemplary simplified and perspectively illustrated embodiment of a linear drive 1 which can be used, for example, in a longitudinal adjustment unit 2 for a seat (not shown) of a motor vehicle (not shown).

The linear drive 1 according to FIG. 1 comprises a rail 10 which is oriented along a longitudinal axis L, at least one slider 30 which is movable transversely to the longitudinal axis L, and at least one drivable drive shaft 50. The drive shaft 50 can be rotated about an axis of rotation X.

The at least one rail 10 is oriented along the longitudinal axis L, wherein, for example, the longitudinal axis L may be predetermined by a vehicle longitudinal axis of the motor vehicle. The rail 10 has at least one slotted link 20 which forms a tooth profile 21 and comprises two profile surfaces 25, 26 facing one another.

The at least one rail 10 is preferably cuboid-shaped in cross section. The groove or opening is preferably on a main surface, which is hereinafter referred to as the slotted link surface 11, of the rail 10.

The slotted link surface 11 preferably spans a rail plane E which is oriented parallel to the longitudinal axis L.

The slotted link 20, designed as a groove or opening, extends in the direction of the normal vector into the rail 10, after which the profile surfaces 25, 26 facing one another are arranged parallel to the normal vector.

The slotted link 20 preferably has a constant slotted link depth.

Figure 30A:
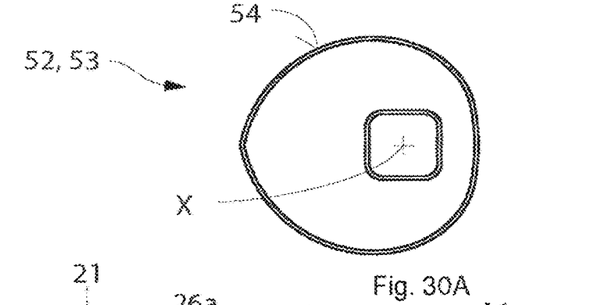
FIG. 30*a* shows a crankshaft or camshaft of the drive shaft according to the embodiments according to FIGS. 1-29.
Figure 30B:
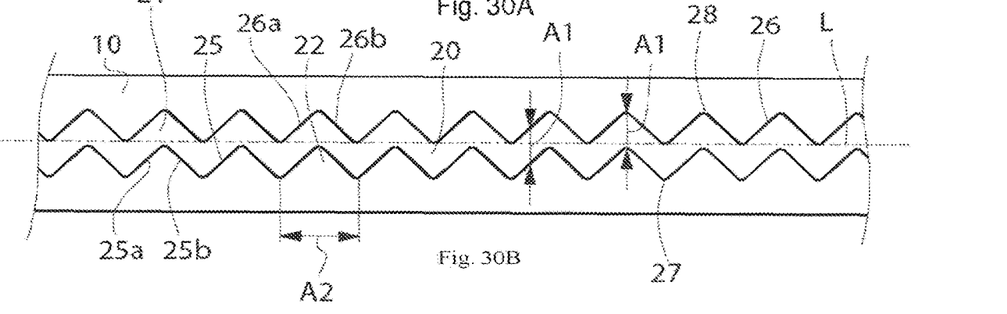
FIG. 30*b* is a detailed view of a rail according to FIGS. 1-29.

The slotted link 20 according to the detailed illustration in FIG. 30*b* comprises the two profile surfaces 25, 26 facing one another, which extend at a constant spacing A1 (see FIG. 2) in a zigzag or wave-like manner to form the tooth profile 21 comprising a plurality of teeth 22. A zigzag-shaped slotted link 20 is shown in detail in FIG. 30*b* and a wave-shaped slotted link 20 is shown in detail in FIG. 30*b*. The spacing A1 can also be referred to as the groove width of the slotted link 20.

The two profile surfaces 25, 26 facing one another of the slotted link 20 are therefore oriented substantially perpendicularly to the rail plane E. The teeth 22 have symmetrical flanks 25*a*, 25*b*, 26*a*, 26*b*, which extend on both sides between the tooth tip and the tooth base. Two adjacent tooth tips are arranged at a tooth spacing A2, or the length of a tooth 22 in the longitudinal axis corresponds with the tooth spacing A2.

Figure 2:
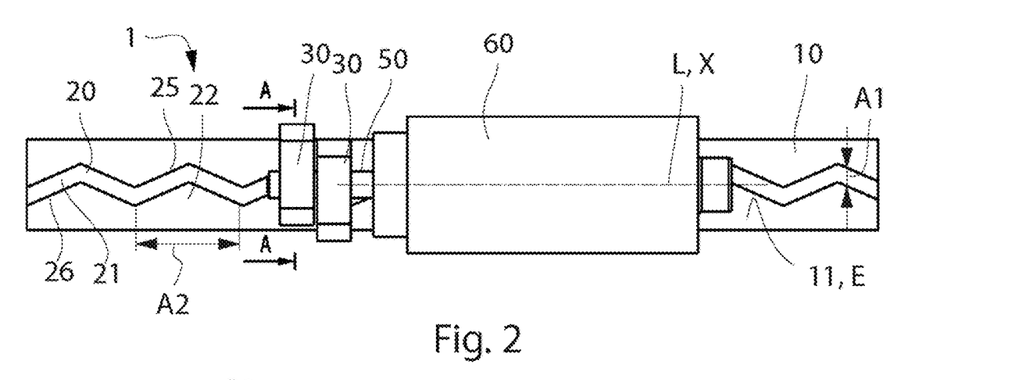
FIG. 2 is a top view of the linear drive according to FIG. 1.

The tooth profile 21 can, as can be seen in FIGS. 1 and 2, extend completely over the rail 10 along the longitudinal axis L.

The embodiments according to the accompanying figures show at least two sliders 30, wherein it should be noted at this point that even a single slider 30 is sufficient to generate propulsion in a direction L1 or L2 of the longitudinal axis L.

The two sliders 30 of a linear drive 1 can be substantially identical in construction, as shown in the embodiments FIGS. 1-21.

The respective slider 30 is coupled to the drivable drive shaft 50 in such a way that the respective slider 30 performs at least one cyclical movement in the course of one revolution of the drive shaft 50.

The slider 30 may have an opening 35 or recess. The opening 35 or the recess preferably extends in the axis of rotation X and may have a width B2 and a height H2.

Figure 3:
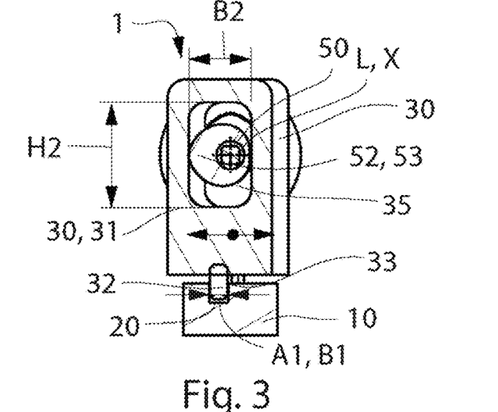
FIG. 3 is a sectional view along section line AA in FIG. 2.
Figure 4:
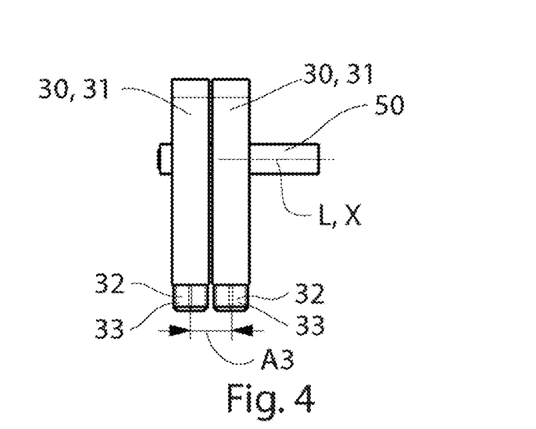
FIG. 4 is a side view of the sliders of the linear drive according to FIG. 1.

To generate propulsion in a direction of the longitudinal axis L, the slider 30 engages the slotted link 20 of the rail 10. For this purpose, the slider 30 may comprise a friction surface 33 which is designed to be in operative contact with the profile surfaces 25, 26 facing one another. As can be seen in FIG. 3, the friction surface 33 may be formed on a pin 32 which, from a base body 31 of the slider 30, engages the slotted link 20 transversely to the longitudinal axis L and perpendicularly to the rail plane E.

The pin 32 may have a cuboid-shaped, diamond-shaped, or round cross-section and may be integrally designed with the base body 31 or may be fastened to, in particular inserted in, the base body 31 of the slider 30.

As can be seen in FIG. 3, the pin 32 has a width B1 which is measured transversely to the longitudinal axis L. Preferably, the width B1 approximately corresponds to the spacing A1 between the two profile surfaces 25, 26, i.e. B1≈A1.

The friction surface 33 may have a surface with improved friction properties in order to reduce the friction between the slotted link 20 and the slider 30. It is preferable for the friction surface 33 to comprise a casing which promotes smooth friction on the profile surfaces 25, 26 facing one another.

The slider 30, in particular the pin 32 of the slider 30, is preferably held in a form-fitting manner in the longitudinal axis L between two profile surfaces 25, 26 facing one another. The form-fitting connection in the longitudinal axis L between the slider 30 and the slotted link 20 can block an undesired movement or freewheeling of the linear drive 1.

The coupling between the drive shaft 50 and the respective slider 30 can be carried out in different ways, as a result of which, according to the embodiments presented here, the coupling can be carried out by guide means 52 which cooperate with the slider 30. The slider 30 may have at least one contact surface 42 which cooperates with the guide means 52.

The guide means 52 may, for example, as shown in the accompanying FIGS. 1-29, be a camshaft disk 53 of a crankshaft or camshaft and engage the opening 35 or recess of the slider 30 and interact there with the slider guide 42.

The drive shaft 50 can be driven by the drive system 60, wherein the drive system 60 is preferably an electric drive system, which is even more preferably coupled to the drive shaft 50 via a gear (not shown).

The guide means 52 or the camshaft disk 53 according to the embodiment according to FIG. 1 and according to the following embodiments is shown in detail in FIG. 30a and can be described as being substantially heart-shaped.

According to the detailed illustration in FIG. 30a, the guide means 52 or the camshaft disk 53 has a contact surface 54 which is at a distance from the axis of rotation X of the drive shaft 50 in the direction of circumference. The spacing between the contact surface 54 and the axis of rotation X changes in the direction of circumference in such a way that the spacing increases predominantly linearly in a direction of circumference in at least a first half and decreases linearly in the direction of rotation in at least a second half. The contact surface 54 extends approximately spirally in the respective half, the contact surface 54 being preferably designed such that the spacing between two diametric sides, measured over the axis of rotation X, is approximately constant.

By the at least one slider 30 being drivingly coupled to the drive shaft 50, the respective slider 30 is set into at least one linear and cyclical movement transverse to the longitudinal axis in the course of one revolution of the drive shaft 50, the cyclical movement of the respective slider 30 occurring in the rail plane E or parallel to the rail plane E. The double arrow in FIG. 3 is intended to illustrate the cyclical movement in the rail plane E or parallel to the rail plane E of the slider 30.

During the cyclical movement of the at least one slider 30, the slider 30 alternately pushes itself along the longitudinal axis L against the profile surfaces 25, 26 facing one another, in order to generate the propulsion. In other words, the slider 30 moves transversely to the longitudinal axis L during at least one rotation of the drive shaft 50 about the axis of rotation X. This interaction is shown, for example, in FIGS. 28 and 29, wherein, in FIG. 29, the drive shaft 50 has completed a quarter turn about the axis of rotation X in an anti-clockwise direction compared to the illustration in FIG. 28.

A complete cycle of the movement comprises, starting from an initial position, a movement in a first direction Y1 and a change of movement in a second direction Y2 at a turning point. The movement in the second direction Y2 continues until the next turning point. Afterwards, there is a return to the starting position.

Figure 28:
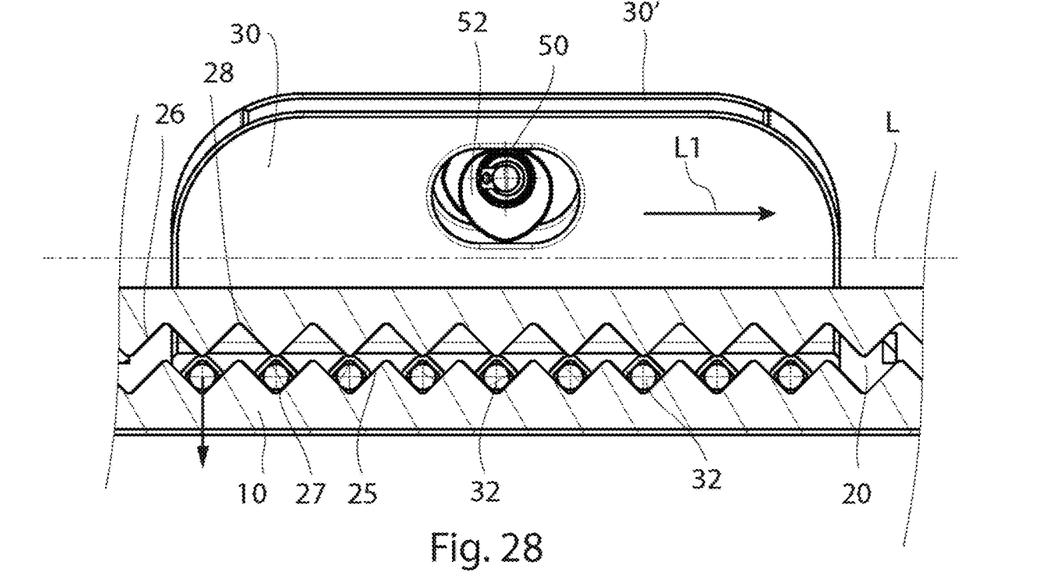
FIG. 28 is a simplified sectional view of the linear drive according to FIG. 25 comprising a slider that engages the slotted link of the rail.
Figure 29:
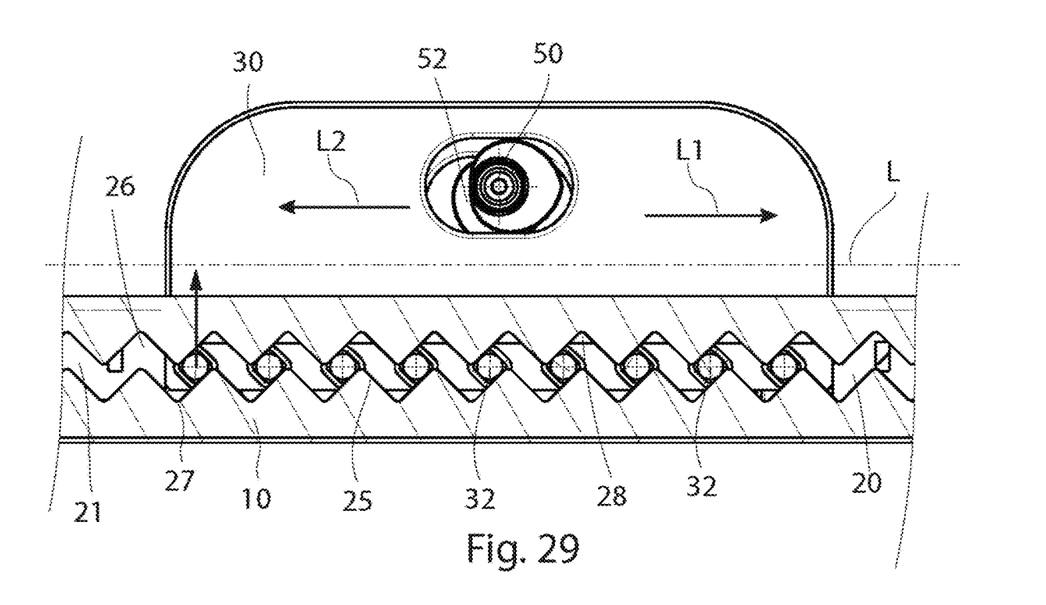
FIG. 29 is a simplified sectional view of the linear drive analogous to FIG. 28, the drive shaft having undergone a quarter turn anti-clockwise about its axis of rotation.

With further reference to FIGS. 28 and 29, it is shown how the slider 30 pushes itself off the flank 25a of the profile surface 25 in the first direction Y1 to generate propulsion in a first direction L1 along the longitudinal axis L and off the flank 26a of the profile surface 26 in the second direction Y2. At the respective turning point, the slider 30 preferably engages a transition of the respective profile surface designed as a tooth base 27, 28, wherein, in the tooth base 27, 28, the slider 30 is held in a form-fitting manner in the longitudinal axis L on one of the two profile surfaces 25, 26 facing one another, i.e. 25a and 25b or 26a and 26b, in the longitudinal axis.

To generate propulsion in a second direction L2 opposite to the first direction L1, the slider 30 slides in the first direction Y1 on the flank 25b of the profile surface 25 and in the second direction Y2 on the flank 26b of the profile surface 26.

In the accompanying embodiments, the linear drive 1 has two sliders 30 in each case. In FIGS. 1 to 3, it is immediately apparent that the two sliders 30 are arranged spaced apart from one another in the longitudinal axis L. The sliders 30 engage the slotted link 20 at a slider spacing A3, the slider spacing A3 being measured parallel to the longitudinal axis L.

The two sliders 30 engage the slotted link 20 with a phase offset, the phase offset φ being preferably selected such that the two sliders 30 are not at a turning point at the same time, or that the two sliders 30 do not engage the tooth bases 27, 28 at the same time.

The phase offset φ of the movement of the sliders 30 can be predetermined by the guide means 52, for which purpose, for example, the camshaft disks 53 are arranged on the drive shaft 50 at different angles around the axis of rotation X. In the following drawings, the angle is approximately 90°, which results in a phase offset φ of a quarter of the cycle length, i.e. φ=¼. The following relationship applies to the slider spacing A3: $A3 = n \times A2 + \varphi \times A2$, where n is a natural integer, i.e. 0, 1, 2, 3, . . . and A2 is the length of a tooth 22 or the tooth spacing. In the illustrated embodiment, the slider spacing is A3=¼A2.

The phase offset φ between the at least two sliders is preferably 0<φ<0.5 and 0.5<φ<1, wherein, in the event that more than two sliders may be provided, the phase offset between two of the three sliders may also be φ=0, φ=0.5, or φ=1, or a multiple thereof.

In the first embodiment according to FIGS. 1 to 4, the two sliders 30 are arranged on one side of the drive shaft to the drive system 60. In the embodiment shown there, each slider 30 has a single pin 32.

Figure 5:
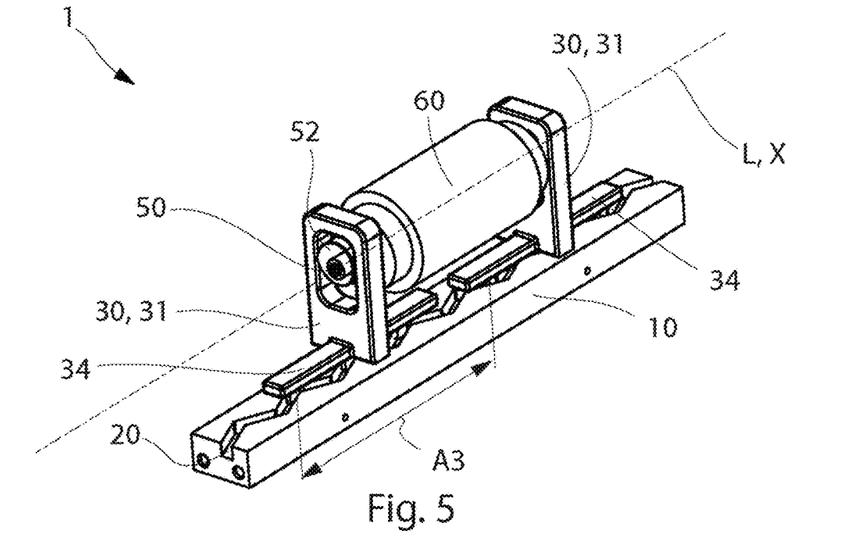
FIG. 5 is a perspective view of a second embodiment of the linear drive.
Figure 6:
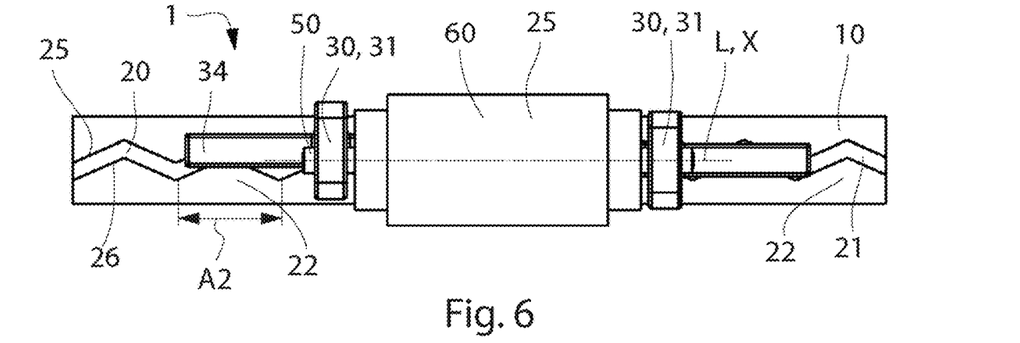
FIG. 6 is a top view of the linear drive according to FIG. 5.
Figure 7:
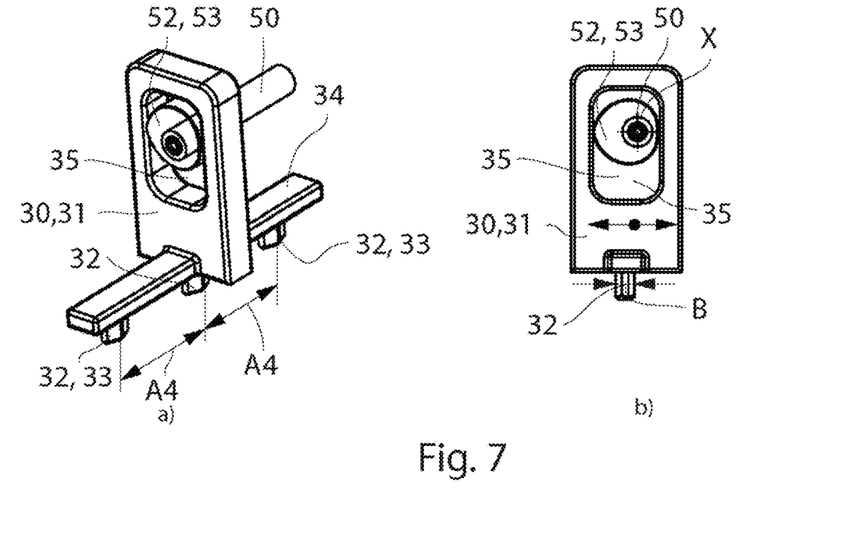
FIG. 7 shows two highly simplified views of a slider according to FIG. 5.

The second embodiment according to FIGS. 5-7 differs from the first embodiment according to FIGS. 1-3 in the design and arrangement of the sliders 30.

As can be seen in FIG. 5, the linear drive 1 has two sliders 30 which are arranged on both sides of the drive system 60 in the axis of rotation X of the drive shaft. The two sliders 30 may be identical in construction.

The two sliders 30 or the pins 32 of the two sliders 30 are arranged at a pin spacing A3, the following relationship also applying here for the pin spacing A3: $A3=n\times A2+\varphi\times A2$ The sliders 30 may be arranged on a common drive shaft 50, or on two different drive shafts 50, wherein the rotation of the drive shaft 50 is preferably synchronized.

The axes of rotation X of the drive shaft 50 or drive shafts 50 are parallel to the longitudinal axis L of the linear drive 1.

Furthermore, it can be seen, in particular in FIGS. 5 and 7, that the respective slider 30 comprises three pins 32 which are arranged in alignment with the longitudinal axis L at a constant pin spacing A4. The three pins 32 are arranged on the base body 31 by means of a cantilever-shaped pin carrier 34. The pin spacing A4 corresponds to the spacing A2, i.e. the spacing between two adjacent tooth tips or the length of a tooth 22 in the longitudinal axis L.

The number of pins 32 on the respective slider 30 can be chosen as desired. By selecting the appropriate number of pins 32, a breaking load of the linear drive 1 can be dimensioned. The pin spacing A4 can also be varied, this preferably being a single or multiple of the tooth spacing A2.

Figure 8:
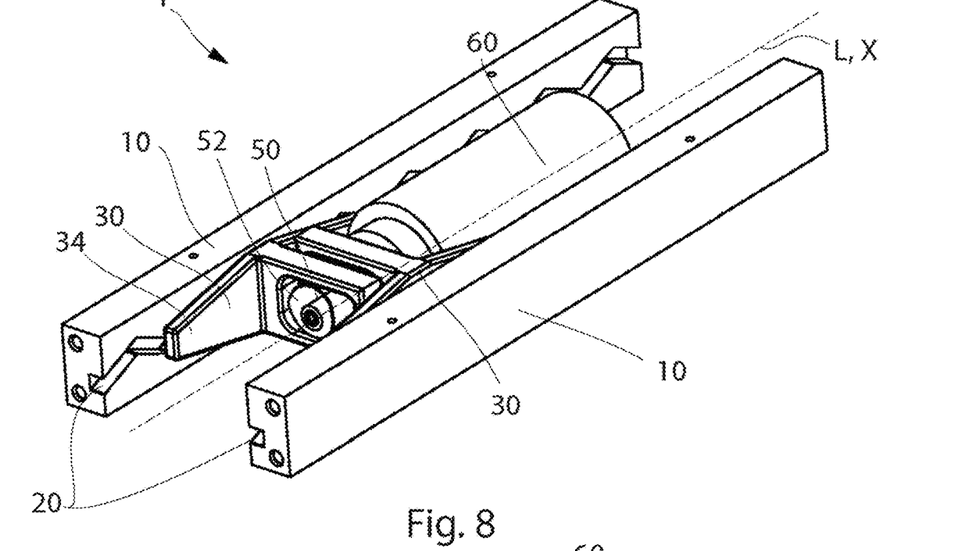
FIG. 8 is a perspective view of a third embodiment of the linear drive.
Figure 9:
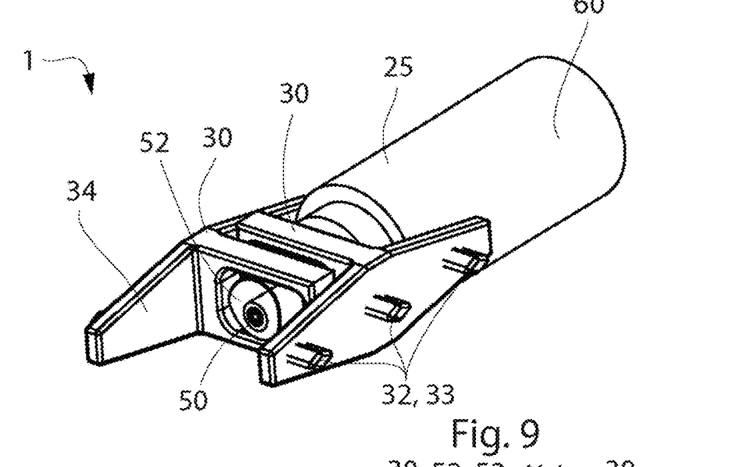
FIG. 9 is a simplified perspective view of the sliders and the drive means according to FIG. 8.
Figure 10:
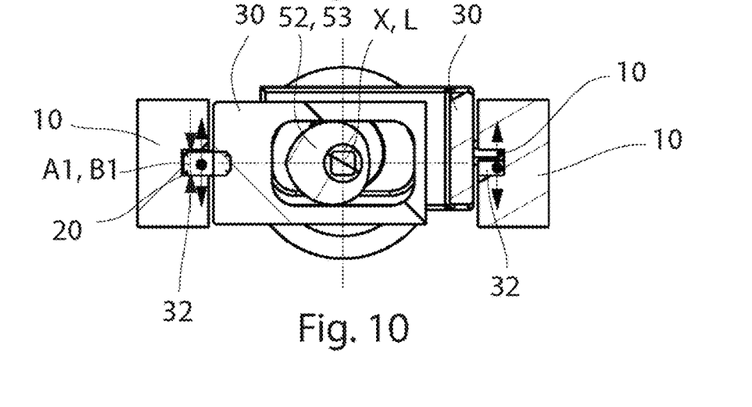
FIG. 10 is a sectional view of the linear drive according to FIG. 8.
Figure 11:
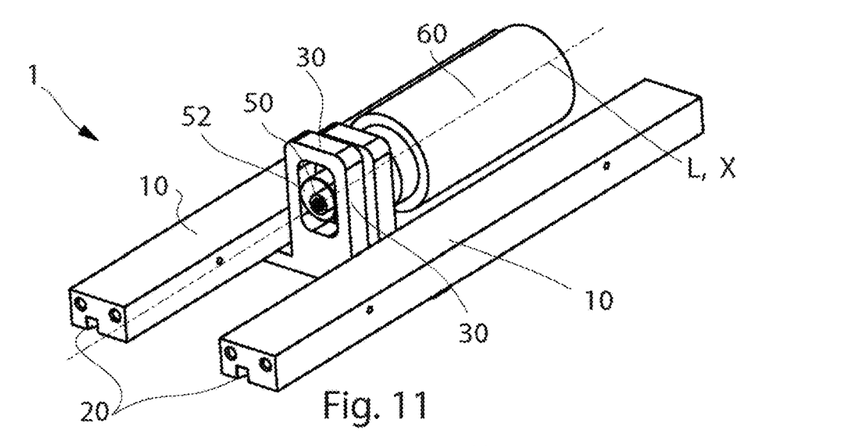
FIG. 11 is a perspective view of a fourth embodiment of the linear drive.
Figure 12:
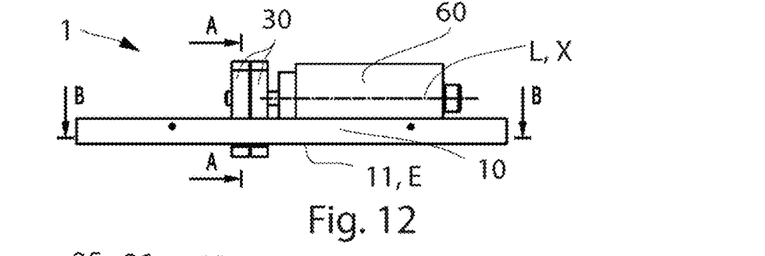
FIG. 12 is a side view of the linear drive according to FIG. 11.
Figure 13:
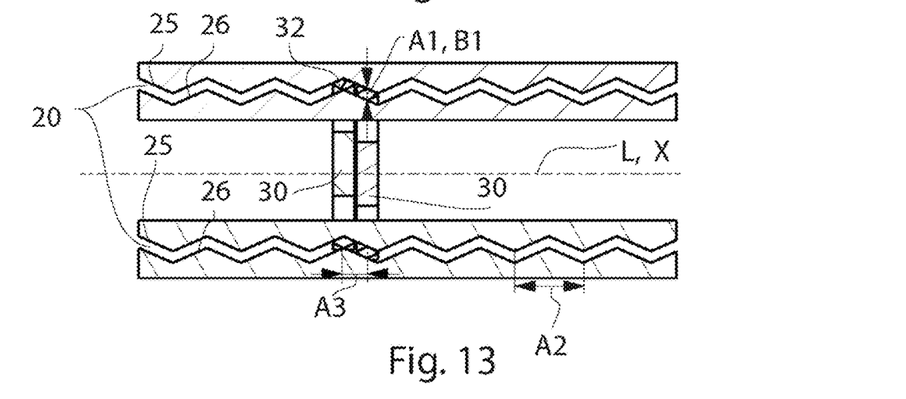
FIG. 13 shows a section according to the section line B-B in FIG. 12.
Figure 14:
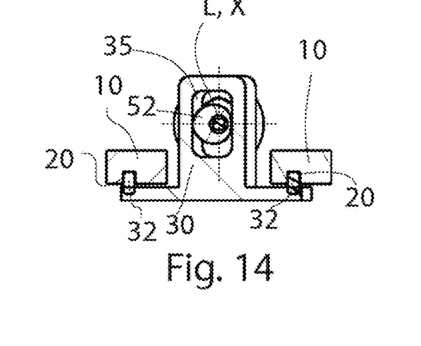
FIG. 14 is a sectional view along the line A-A according to FIG. 12.
Figure 15:
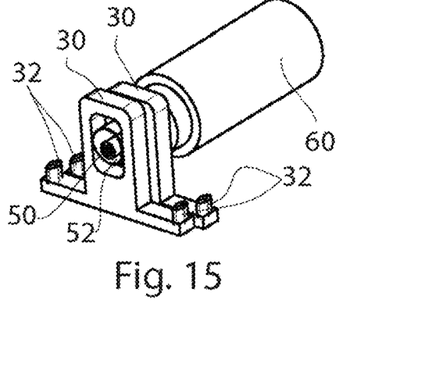
FIG. 15 shows two representations of the sliders and the drive means according to FIG. 11.

The third embodiment, which is shown in FIGS. 8-10, can be considered as a combination of the previously described embodiments, but with the difference that two rails 10 are arranged in parallel with and spaced apart from each other along the longitudinal axis L and each of the two sliders 30 engages one of the rails 10. The sliders 30, the drive shaft 50 comprising the guide means 52, and the drive system 60 are arranged between the two rails 10, the slotted link surfaces 11 of the two rails 10 being arranged so as to face one another.

The respective slider 30 is designed analogously to the slider 30 according to FIG. 6 and, in each case, has three pins 32 which are arranged along the longitudinal axis L at the pin spacing A4. The pin carrier 34 is diamond-shaped, with the middle pin 32 arranged centrally on the pin carrier 34 and centrally to the base body 31.

The two sliders 30 engage—as already described in detail in connection with a previous embodiment—in the respective slotted link of the rail 10 in a phase-offset manner, the phase offset in the illustrated embodiment according to FIGS. 8-10 being achieved by an angular offset between the guide means 52 or the camshaft disks 53—as shown, in particular in FIG. 9. Accordingly, the tooth profiles 21, formed by the slotted links 20, of the two rails 10 are in the same phase or are formed in a line-mirrored manner.

A fourth embodiment can be seen in FIGS. 11-15. The fourth embodiment is similar to the first embodiment according to FIGS. 1-4, but with the difference that two rails 10 are arranged parallel and spaced apart along the longitudinal axis L, and that each of the sliders 30 engages the respective rail 10. Furthermore, the slotted link surfaces 11 comprising the slotted links 20 are arranged on the side of the rail 10 facing away from the axis of rotation X.

The respective slider 30 can be described as T-shaped and the pins 32 are arranged transversely to the longitudinal axis on opposite sides on a pin carrier 34, wherein the pins 32 protrude on the side of the pin carrier 34 facing the axis of rotation X.

Figure 16:
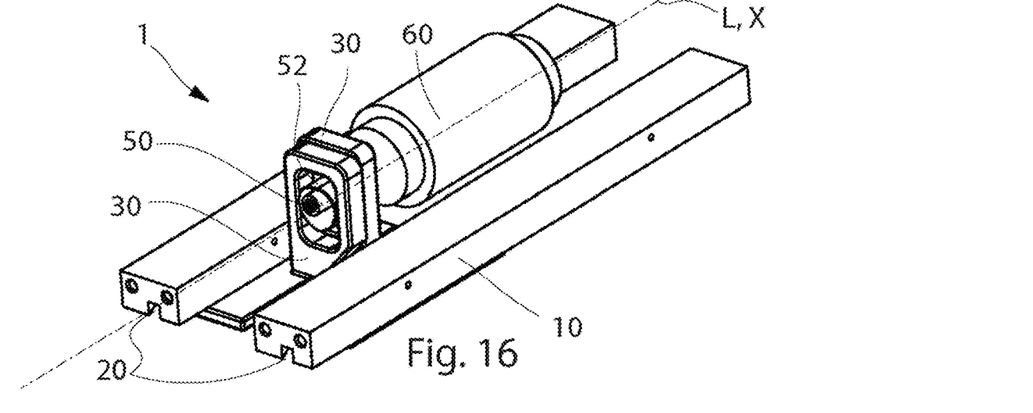
FIG. 16 is a perspective view of a fourth embodiment of the linear drive.
Figure 17:
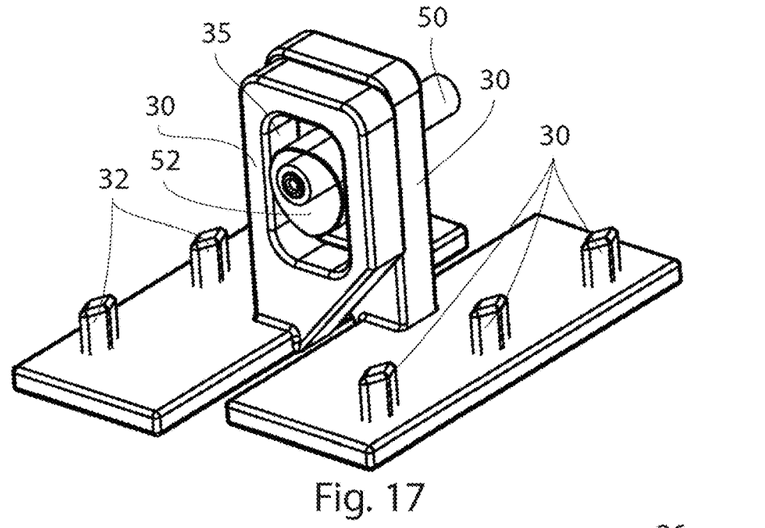
FIG. 17 is a simplified perspective view of the sliders of the linear drive comprising the drive shaft according to FIG. 16.
Figure 18:
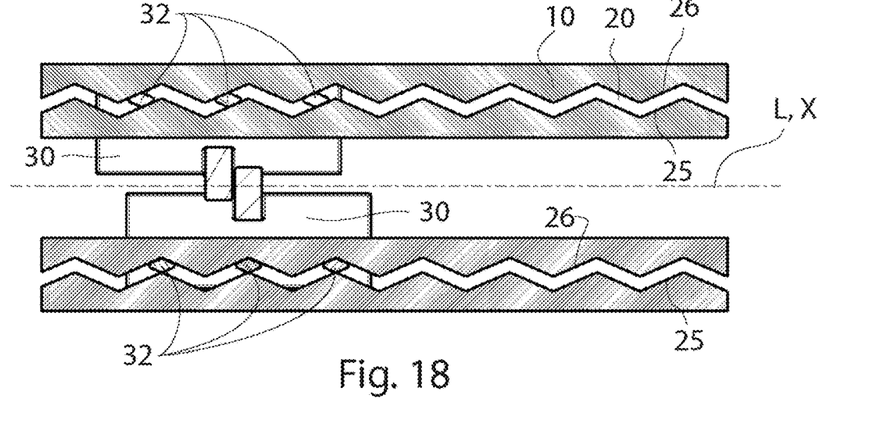
FIG. 18 is a sectional view of the linear drive according to FIG. 16.

A fifth embodiment can be seen in FIGS. 16-18. The fifth embodiment is similar to the fourth embodiment according to FIGS. 11-15, but with the difference that the respective slider 30 engages one of the two rails 10, and that the respective slider 30 has three pins 32 along the longitudinal axis L, which are arranged at the pin spacing A4.

The respective slider 30 can be described as L-shaped and the three pins 32 are arranged in the longitudinal axis L on the pin carrier 34, the pins 32 protruding on the side of the pin carrier 34 facing the axis of rotation X.

Figure 19:
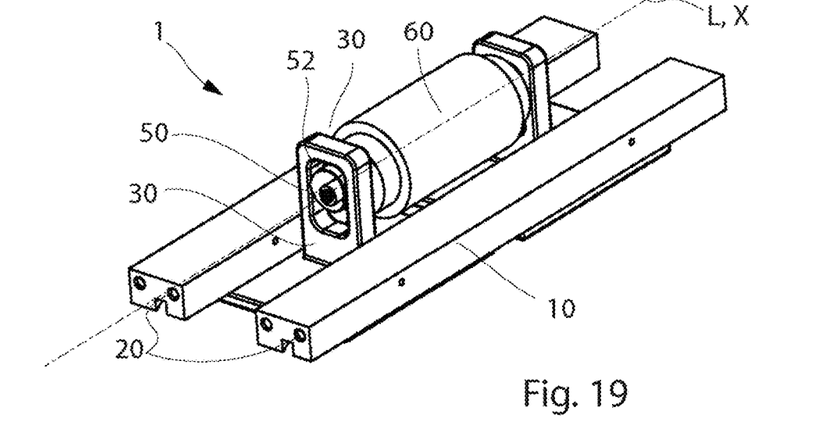
FIG. 19 is a perspective view of a fifth embodiment of the linear drive.
Figure 20:
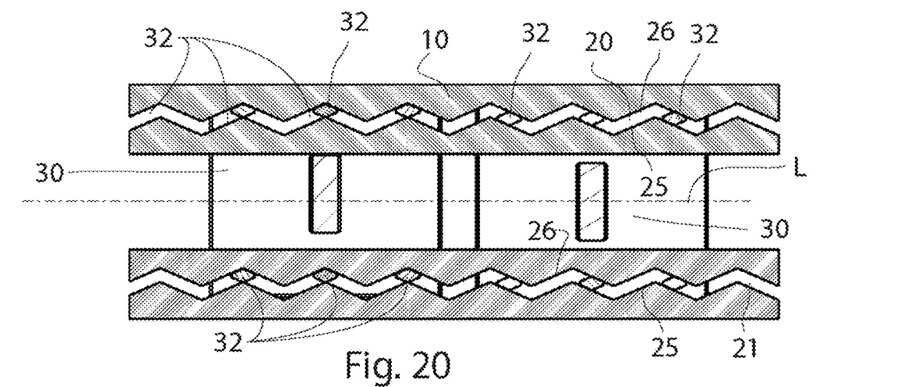
FIG. 20 is a sectional view of the linear drive according to FIG. 19.
Figure 21:
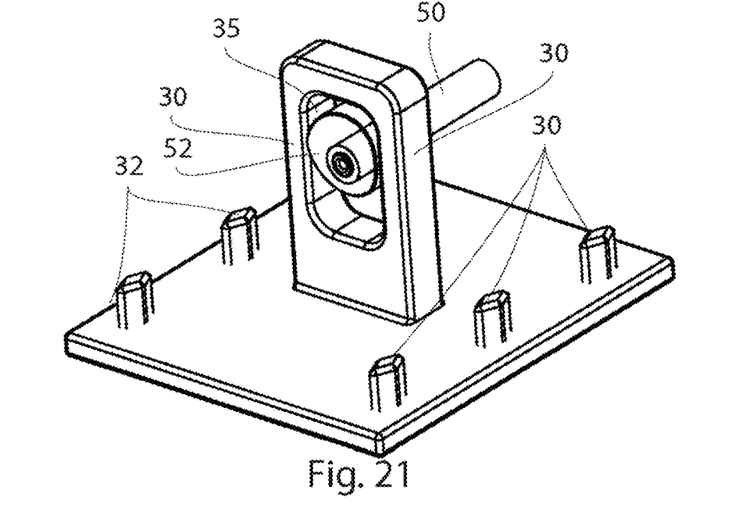
FIG. 21 is a simplified perspective view of the sliders of the linear drive comprising the drive shaft according to FIG. 19.

A sixth embodiment can be seen in FIGS. 19-21.

The sixth embodiment is similar to the fourth embodiment according to FIGS. 11-15, but with the difference that the two sliders 30 are arranged in the longitudinal axis L on sides of the drive system 60 facing one another and that each slider 30 has three pins 32 which engage the respective rail 10. In total, each slider 30 therefore has six pins 32.

The respective slider 30 can be described as T-shaped and the six pins 32 are arranged on the pin carrier 34 in two rows along the longitudinal axis L, each row being for one of the rails 10, wherein the pins 32 protrude on the side of the pin carrier 34 facing the axis of rotation X.

Figure 22:
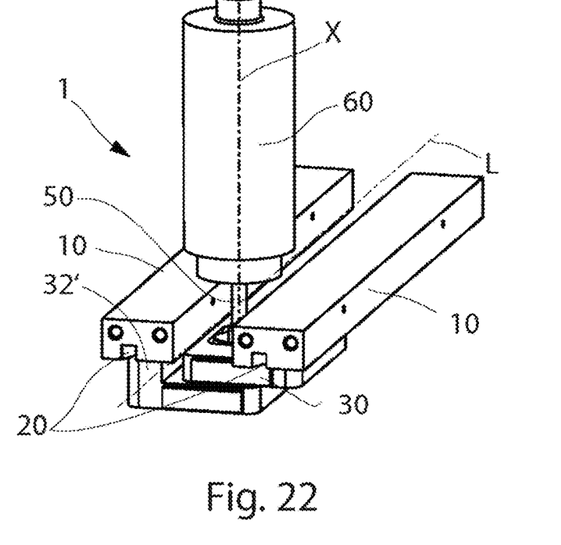
FIG. 22 is a perspective view of a sixth embodiment of the linear drive.
Figure 23:
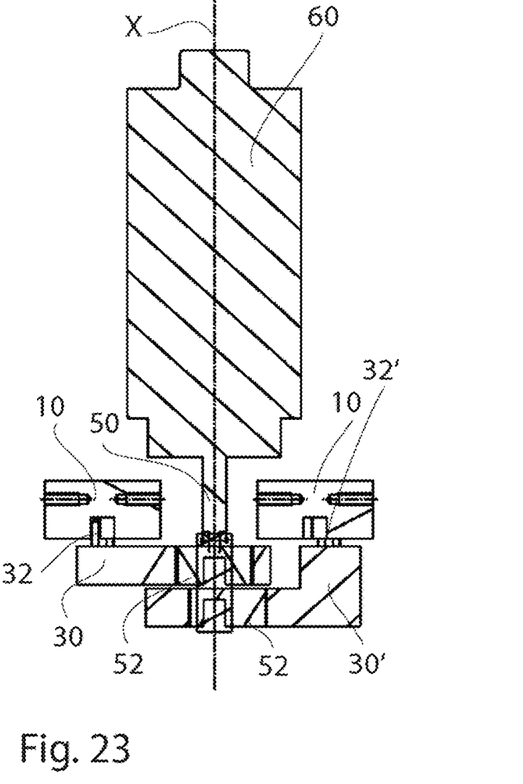
FIG. 23 is a simplified sectional view of the linear drive transverse to the longitudinal axis according to FIG. 22.
Figure 24:
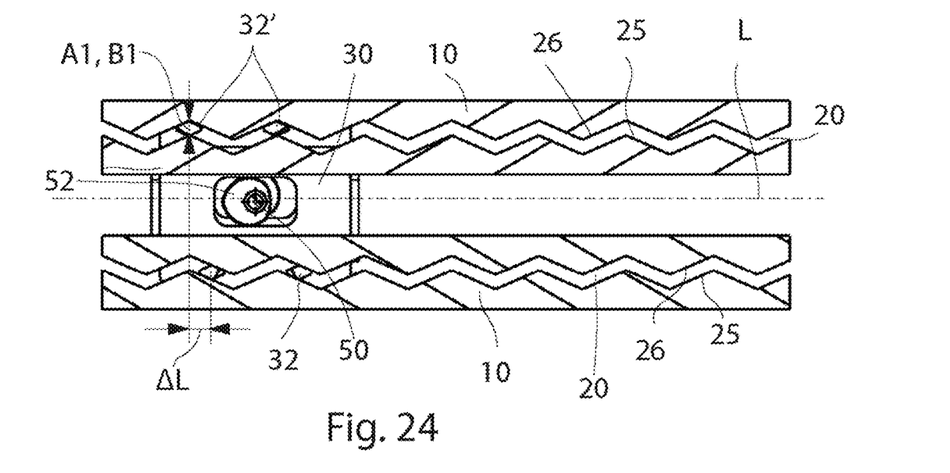
FIG. 24 is a simplified sectional view parallel to the longitudinal axis of the linear drive according to FIG. 22.

A seventh embodiment can be seen in FIGS. 22-24, where it can be emphasized here that, in this embodiment, the axis of rotation X of the drive shaft 50 is oriented transversely to the longitudinal axis L.

Along the longitudinal axis L—as in the previously described embodiments—two rails 10 are arranged in parallel with and spaced apart from one another, the respective slotted link 20 being arranged in the respective rail 10 on the side facing away from the drive system 60.

The rail planes E of the two rails 10 lie one inside the other, but they may also be arranged in parallel and spaced apart according to a further development (not shown). It is also possible for the slotted links 20 to be arranged on the side of the rails 10 that faces the drive system 60.

Unlike in the previously described embodiments, the two sliders 30 are not identical in construction. To illustrate this, one of the sliders 30 in FIGS. 22-24 is marked with the reference sign 30' for better understanding in order to emphasize the different design of the sliders 30 in the drawings. In contrast to the slider 30, the slider 30' may have a pin carrier 34 which projects from the base body 31 of the slider 30' in the direction of the rail 10 along the axis of rotation X.

It is noted at this point that the slotted links 10 may also be arranged on the side of the rails 10 that faces the drive system 60. The rail planes E of the rails 10 may also be parallel and spaced apart, preferably such that the sliders 30 can lie in a common plane.

With reference to the accompanying FIG. 24, it can also be seen that the respective slider 30, 30' has two pins 32, 32'. It is emphasized that the number of pins 32, 32' of each individual slider 30, 30' can be chosen as desired. The pins 32, 32' of the respective slider 30, 30' are arranged along the longitudinal axis L at a pin spacing A4. The pin spacing A4 substantially corresponds to the tooth spacing A2, which describes the spacing between two adjacent tooth tips.

Furthermore, it can be seen in FIG. 24 that the pins 32 of the slider 30 and the pins 32' of the slider 30' are arranged so as to be offset from one another in the longitudinal axis L by an offset ΔL, the offset ΔL correlating with the phase offset in the cyclical movement between the two sliders 30 and 30'.

The phase offset φ of the movement of the sliders 30, 30' can also be predetermined in this embodiment by the guide means 52, as already described above. As can be seen, in particular in FIG. 24, the camshaft disks 53 are arranged on the drive shaft 50 so as to be rotated at different angles about the axis of rotation X. In this specific embodiment, the angle is approximately 90°, which results in a phase offset φ of a quarter of the cycle length, i.e. φ=¼.

The following relationship applies to the offset ΔL: ΔL=φ×A2. In the illustrated embodiment, the slider spacing is ΔL=¼A2. Preferably, the phase offset φ between the at least two sliders 30, 30' is: 0<φ<0.5 and 0.5<φ<1. In the event that more than two sliders 30, 30' are provided, the phase offset φ between two of the three sliders 30, 30' can also be φ=0, φ=0.5, or φ=1 or a multiple thereof.

Figure 25:
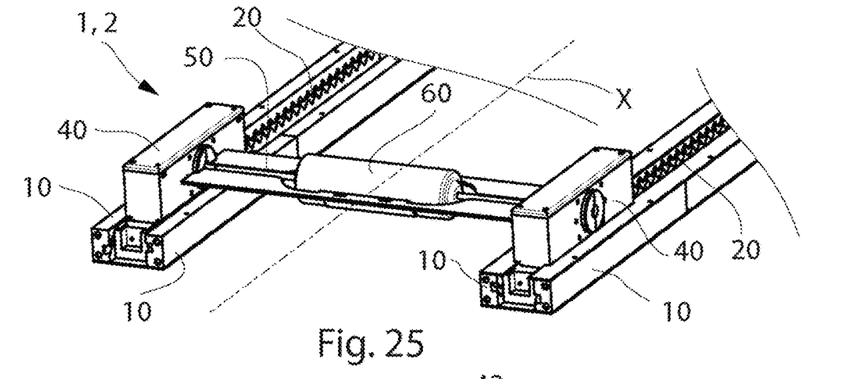
FIG. 25 is a perspective view of a seventh embodiment of the linear drive.

The eighth embodiment of a linear drive 1 is shown in FIGS. 25-29, wherein, in FIG. 25, the linear drive 1 is used in a longitudinal adjustment unit 2, for example of the motor vehicle.

The linear drive 1 according to this embodiment is designed based on the embodiment 7 in the sense that the axis of rotation X of the drive shaft 50 is arranged so as to be oriented transversely to the longitudinal axis L.

The linear drive 1 comprises two rails 10 which are arranged in parallel and spaced apart along the longitudinal axis. The respective rail 10 comprises—as already described in detail above—a corresponding slotted link 10 which is arranged in the respective slotted link surface 11 of the respective rail 10 in a rail plane E. The two slotted link surfaces 11 of the two rails 10 face each other and two sliders 30, 30', each of which engages one of the slotted links 20, are arranged in a free space between the rails 10.

Figure 26:
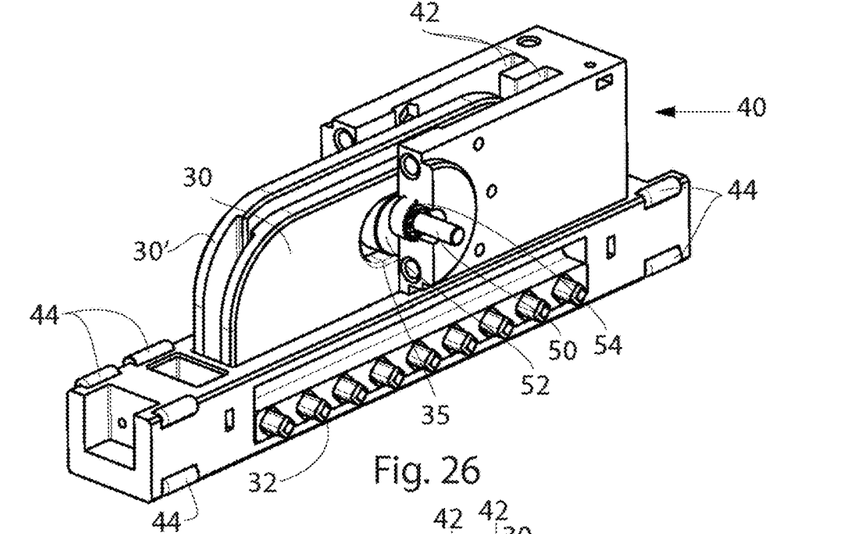
FIG. 26 is a simplified perspective view of the linear drive according to FIG. 25.
Figure 27:
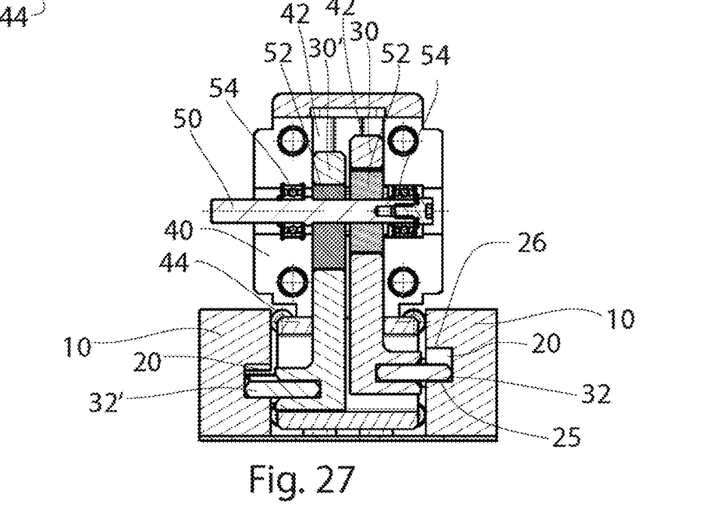
FIG. 27 is a simplified sectional view transverse to the longitudinal axis of the linear drive according to FIG. 25.

The linear drive 1 may, as shown by way of example in FIGS. 25-27, have a housing 40 designated as a whole. The housing 40 may be in several parts and can accommodate the sliders 30 in whole or in part and can also provide a linear guide 42 for the at least one slider 30. The linear guide 42 keeps the at least one slider 30 guided transversely to the longitudinal axis L in a linear manner.

Furthermore, the housing 40 may have support means 44 which are configured to support the housing 40, as can be seen, in particular in FIGS. 26 and 27, relative to the at least one rail 10 or relative to the two rails 10.

The housing 40 may also comprise receptacles in which bearings 56 for the drive shaft 50 are supported.

The sliders 30, 30' are designed analogously to the sliders according to the embodiment 7, the sliders 30, 30' in this embodiment each having nine pins 32, which are arranged in the longitudinal axis at a pin spacing A4. The pins 32, 32' of the slider 30 and of the slider 30' are arranged in the longitudinal axis at an offset ΔL and the cyclical movement of the two sliders 30, 30' occurs with a phase offset φ, as already described above.

The longitudinal adjustment unit 2 according to FIG. 25 may comprise two linear drives 1, it being possible to drive the drive shaft 50 of the respective linear drive 1 by means of a common drive system 60. For example, both linear drives 1 may have a common drive shaft 50, which results in the linear drives 1 synchronizing.

Figure 31A:
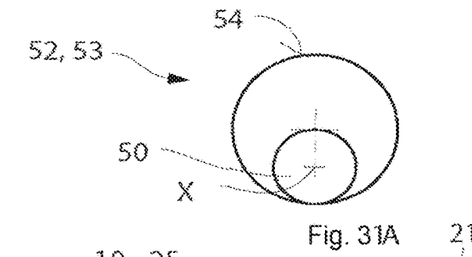
FIG. 31*a* is a further development of the crankshaft or camshaft of the drive shaft.
Figure 31B:
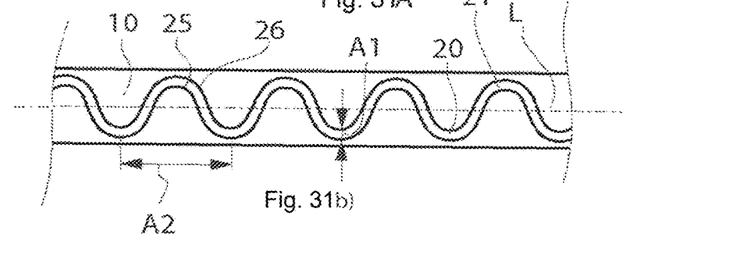
FIG. 31*b* is a detailed view of the rail for a crankshaft or camshaft according to FIG. 31*a*.

FIG. 31 shows a further development of the rail 10 and of an associated guide means 52 or a camshaft disks 53. The slotted link 20 of the rail 10 is, as already described above, wave-shaped, it being possible to describe the waveform more precisely as a sine. A pin 32 with a round, in particular circular, cross-section preferably engages a slotted link 20 designed in this way.

LIST OF REFERENCE NUMERALS

1 Linear drive
2 Longitudinal adjustment unit
10 Rail
11 Slotted link surface
20 Slotted link
21 Tooth profile
22 Tooth
25 Profile surface
25a Tooth flank
25b Tooth flank
26 Profile surface
26a Tooth flank
26b Tooth flank
27 Tooth base
28 Tooth base
30 Slide
31 Base body of 30
32 Pin
33 Friction surface
34 Pin carrier
35 Opening
40 Housing
42 Slider guide
44 Support means
50 Drive shaft
52 Guide means
53 Camshaft disk
54 Contact surface
60 Drive system
A1 Spacing
A2 Tooth spacing
A3 Slider spacing
A4 Pin spacing
B1 Width of 32
B2 Width of 35
E Rail plane
H2 Height
L Longitudinal axis
ΔL Offset
X Axis of rotation of 50

The invention claimed is:

1. A linear drive (1), comprising:
at least one rail (10) which is oriented along a longitudinal axis (L) and has at least one slotted link (20) forming a tooth profile (21) which comprises two profile surfaces (25, 26) facing one another;
at least one slider (30) which is movable transversely to the longitudinal axis (L) and engages the at least one slotted link (20); and
a drive shaft (50),
wherein the at least one slider (30) is drivingly coupled to the drive shaft (50) in such a way that the slider (30) performs at least one cyclical movement in the course of one revolution of the drive shaft (50) and can thereby alternately push itself off the profile surfaces (25, 26) facing one another in the at least one slotted link (20) to generate propulsion in a direction of the longitudinal axis (L),
and wherein the drive shaft (50) is arranged outside the slotted link (20).

2. The linear drive (1) according to claim 1, characterized in that:
the slider (30) comprises at least one pin (32); and
the at least one pin (32) has at least one friction surface (33) which is adapted to be able to come into operative contact with the profile surfaces (25, 26) facing one another, in order to generate propulsion.

3. The linear drive (1) according to claim 2, characterized in that the at least one friction surface (33) corresponds with the shape of a tooth base (28) of the tooth profile (21).

4. The linear drive (1) according to claim 1, characterized in that the drive shaft (50) comprises a crankshaft or camshaft and has at least one guide means (52) which specifies the cyclical movement of the at least two sliders (30) during the rotation of the drive shaft (50).

5. The linear drive (1) according to claim 4, characterized in that the at least one guide means (52) is designed such that the slider (30) performs an approximately linear movement between the turning points of the cyclical movement.

6. The linear drive (1) according to claim 1, characterized in that at least two sliders (30) are provided, and in that the cyclical movement of the at least two sliders (30) takes place with a phase offset relative to the slotted link (20).

7. The linear drive (1) according to claim 1, characterized in that the tooth profile (21) of the slotted link (20) has a zigzag or wave-shaped profile.

8. The linear drive (1) according to claim 1, characterized in that a spacing between the profile surfaces (25, 26) facing one another is constant.

9. The linear drive (1) according to claim 1, characterized in that the slotted link (20) is designed as a groove or opening in the at least one rail (10).

10. The linear drive (1) according to claim 1, characterized in that the slider (30) comprises at least one pin (32).

11. The linear drive (1) according to claim 1, characterized in that:
the slider (30) comprises at least one pin (32); and
a spacing between the profile surfaces (25, 26) of the slotted link (20) facing one another corresponds with the size of the at least one pin (32).

12. The linear drive (1) according to claim 1, characterized in that:
the slider (30) comprises at least one pin (32); and
the at least one pin (32) is dimensioned such that sides of the pin (32) facing one another are in operative contact with profile surfaces (25, 26) facing one another.

13. The linear drive (1) according to claim 1, characterized in that the slider (30) and/or the slotted link (20) is or are symmetrical.

14. The linear drive (1) according to claim 1, characterized in that the drive shaft (50) is arranged in a plane parallel to and spaced apart from a plane defined by the rail, or in that the drive shaft (50) is arranged in a plane parallel to and spaced apart from a plane perpendicularly to the rail plane.

15. The linear drive (1) according to claim 1, characterized in that at least one second slotted link (20) is provided and in that at least one of the two sliders (30) engages the second slotted link (20).

16. The linear drive (1) according to claim 1, characterized in that the at least one second slotted link (20) is arranged in the rail plane (E) or at least in a plane parallel to the rail plane (E).

17. The linear drive (1) according to claim 1, characterized in that the at least one second slotted link (20) is arranged in a second rail (10).

18. The linear drive (1) according to claim 1, characterized in that a housing (40) is provided, and in that the drive shaft (50) and at least one of the at least two sliders (30) are movably mounted on the housing (40) transversely to the longitudinal axis (L).

19. The linear drive (1) according to claim 1, characterized in that a drive system (60) is provided, wherein the drive system (60) drives the drive shaft (50).

20. The linear drive (1) according to claim 1, characterized in that the drive system (60) is arranged between the at least two sliders (30) in the longitudinal axis (L).

21. A longitudinal adjustment unit (2) having a linear drive (1) according to claim 1.

22. A motor vehicle comprising a linear drive (1) according to claim 1.

23. The linear drive (1) according to claim 1, characterized in that the slider (30) comprises at least two pins (32).

24. A linear drive (1), comprising:
at least one rail (10) which is oriented along a longitudinal axis (L) and has at least one slotted link (20) forming a tooth profile (21) which comprises two profile surfaces (25, 26) facing one another;
at least one slider (30) which is movable transversely to the longitudinal axis (L) and engages the at least one slotted link (20), the slider (30) comprising at least one pin having a cuboid, diamond, or cylindrical-shaped cross section; and
a drive shaft (50),
wherein the at least one slider (30) is drivingly coupled to the drive shaft (50) in such a way that the slider (30) performs at least one cyclical movement in the course of one revolution of the drive shaft (50) and can thereby alternately push itself off the profile surfaces (25, 26) facing one another in the at least one slotted link (20) to generate propulsion in a direction of the longitudinal axis (L).

* * * * *